Jan. 3, 1967 R. J. LAUFER 3,296,311
PROCESS FOR THE NUCLEAR BROMINATION OF THIOPHENOLS
Filed Jan. 10, 1964
1. BROMINATION
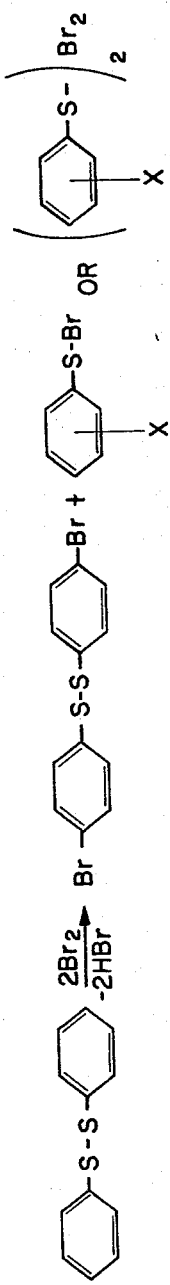
2. OXIDATIVE TREATMENT
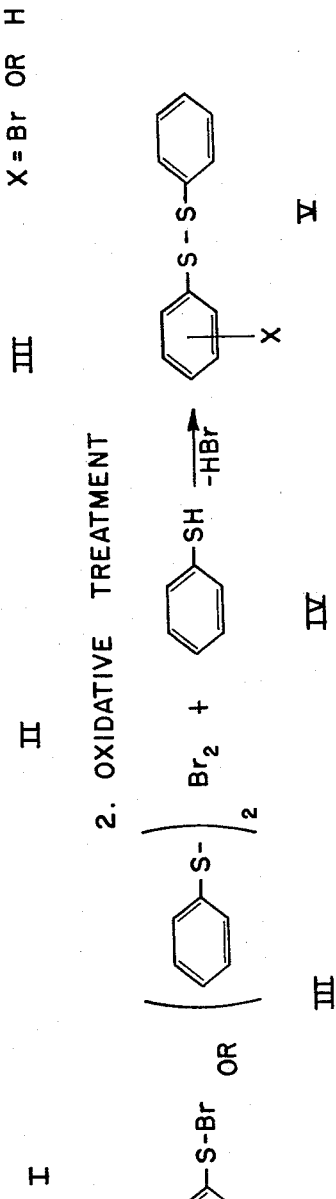
3. INTERCHANGE REACTION
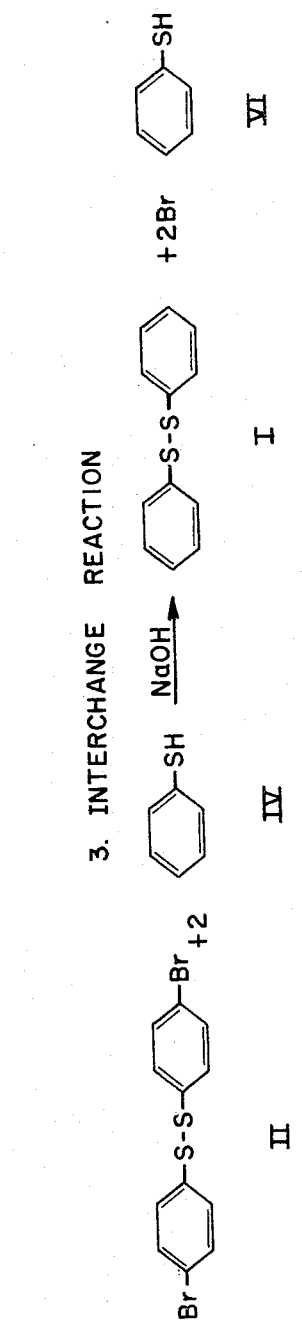
INVENTOR.
R. J. LAUFER
BY D. Leigh Fowler, Jr.
ATTORNEY _United States Patent Office_

3,296,311
Patented Jan. 3, 1967

3,296,311
PROCESS FOR THE NUCLEAR BROMINATION OF THIOPHENOLS
Robert J. Laufer, Pittsburgh, Pa., assignor to Consolidation Coal Company, Pittsburgh, Pa., a corporation of Pennsylvania
Filed Jan. 10, 1964, Ser. No. 336,989
3 Claims. (Cl. 260—609)

This invention relates to an improved process for the introduction of bromine into the nucleus of thiophenol and certain alkyl-substituted thiophenols.

Thiophenols are sulfur analogs of phenols. However, their chemistry, in most cases, bears little resemblance to that of phenols. Reactions which normally produce ring or nuclear substitution in the case of phenols produce S-substitution or oxidation of the sulfur atom in the case of thiophenols. For example, treatment of thiophenol with a halogen such as bromine, chlorine, or iodine, produces diphenyl disulfide as shown in the following equation:

$$2C_6H_5SH + Br_2 \rightarrow C_6H_5S \cdot SC_6H_5 + 2HBr\uparrow$$

Thus, it is impossible to effect nuclear bromination of thiophenols by direct treatment with bromine. However, it is possible to effect nuclear bromination of diphenyl disulfide, and from the brominated diphenyl disulfide obtain bromothiophenol. The nuclear bromination of diphenyl disulfide is accomplished simply by reacting bromine with diphenyl disulfide. Bourgeois and Abraham (Rec. Trav. Chim. 30, 407 (1911)) described the reaction of equimolar quantities of diphenyl disulfide and bromine at 12° C. to yield 96.3% of bis-(p-bromophenyl) disulfide, M.P. 93.5° C.

Bis-(p-bromophenyl) disulfide in a purified state may be converted to p-bromothiophenol by any one of the following reactions: (1) reduction with zinc and hydrochloric acid, (2) catalytic hydrogenation, and (3) alkali-metal catalyzed interchange with thiophenol. Bourgeois and Abraham, cited above, describe the reduction of bis-(p-bromophenyl) disulfide, in a purified form, with zinc and hydrochloric acid to yield p-bromothiophenol, M.P. 75° C. The catalytic hydrogenation of bis-(p-bromophenyl) disulfide, to the best of my knowledge, has not been reported in the literature. However, such hydrogenation to yield p-bromothiophenol has been done in our laboratories using molybdenum disulfide as the catalyst. Molybdenum disulfide is a well-known catalyst for hydrogenation of sulfur-containing compounds. The alkali-metal mercaptide catalyzed interchange with thiophenol has been generally described in U.S. Patent No. 2,510,893 and other literature. The general interchange reaction as applied specifically to the conversion of bis-(p-bromophenyl) disulfide is as follows:

$$BrC_6H_5S \cdot SC_6H_5Br + 2C_6H_5SH \rightarrow \\ 2BrC_6H_5SH + C_6H_5S \cdot SC_6H_5$$

All of the foregoing reactions for the conversion of bis-(p-bromophenyl) disulfide to p-bromothiophenol are extremely effective, provided the bis-(p-bromophenyl)disulfide is in a substantially pure condition. However, I have found that the conversion is either completely thwarted or seriously impaired if the crude product obtained from the bromination of diphenyl disulfide is used as the feedstock to the conversion-to-thiol step. Apparently, the crude bromination product contains a minor amount of by-product which interferes, and even poisons, the subsequent conversion. At first it was thought that it might be residual bromine or hydrogen bromide that was causing the trouble, but these two, being gases, are readily removed by any suitable degassing technique. Resort to such techniques did not cure the trouble. It was imperative to find a solution since the cost of the over-all process, already inherently expensive, would be greatly increased by the necessity of refining the disulfide before its conversion to the thiol. Furthermore, as will be shown below, the same trouble plagued attempts to effect nuclear bromination of the alkyl thiophenols generally.

The primary object of this invention is to provide an improved process for making bromothiophenols.

Another object of this invention is to provide an improved process for making bromothiophenols from the bromination products of diphenyl disulfides without the necessity of first recovering the desired bis-(bromophenyl) disulfide in high purity.

I have found that the bromination products of diphenyl disulfide generally comprise, in addition to some unreacted diphenyl disulfide, about 90 to 95% of the desired bis-(p-bromophenyl) disulfide and about 5 to 10% of a by-product containing bromine. This by-product is apparently either a bromine-disulfide complex or a sulfenyl bromide, or both. In any case, it is this material which heretofore has been removed from the bis-(p-bromophenyl) disulfide in the course of its purification before the latter was converted to p-bromothiophenol.

In accordance with my invention, I have discovered that the deleterious effect of the bromine-containing by-product upon the subsequent conversion-to-thiol step is prevented by the addition of thiophenol to the brominated diphenyl disulfide product mixture at or near room temperature. Preferably, before the thiophenol is added, the product mixture is degassed, that is, any free bromine or hydrogen bromide is removed. The addition of the thiophenol results in the formation and evolution of more hydrogen bromide, indicating oxidation of the thiophenol to diphenyl disulfide by the bromine-containing by-product. For this reason, I call the addition of the thiophenol an oxidative treatment. The addition of the thiophenol is continued until no more hydrogen bromide is evolved. The product thus obtained consists essentially of disulfides which may then be readily converted to thiols without any of the previously mentioned deleterious effects.

In the preferred embodiment of my invention, the product mixture, after completion of the above-described oxidative treatment with thiophenol, is subjected to the interchange reaction with additional thiophenol as described in the previously cited U.S. Patent No. 2,510,893. As a result of this interchange, the desired p-bromothiophenol is obtained and diphenyl disulfide is recovered for recycle to the bromination step. Thus, the only extraneous reactants fed to the integrated process are bromine and thiophenol.

The series of equations shown in the drawing for the production of para-bromothiophenol illustrate the operation of the preferred embodiment of my process. In the equations, the Roman numerals I to VI designate the different chemicals involved. The starting compound I is diphenyl disulfide which may readily be obtained by the oxidative treatment in conventional fashion of the thiophenol designated by numeral IV. The diphenyl disulfide is brominated by reaction with bromine as described by Bourgeois and Abraham, cited above, to yield bis-(p-bromophenyl) disulfide designated by the numeral II and a minor amount, 5 to 10%, of the postulated compounds designated by the numeral III (see Equation 1). Thiophenol, designated by the numeral IV, is then added to the product mixture so long as HBr is generated, whereby the product designated by the numeral V is obtained (see Equation 2). At this point, the product is a mixture of disulfides. To this mixture is added thiophenol in amount sufficient to convert, by means of the interchange reaction, at least the disulfide II to its corresponding thiophenol as indicated in Equation 3. The interchange between the added thiophenol IV and the disulfide II takes place in the presence of a strongly basic catalyst such as an alkali-metal hydroxide, preferably sodium hydroxide, at a low temperature, for example 50° C. The product of the interchange is p-bromothiophenol VI. The other product I is the same disulfide used as the feedstock in the reaction of Equation 1. Thus, once this disulfide is made, except for losses, there is no need to make more. The thiophenol IV is the true feedstock of the series of reactions. While the interchange reaction set forth in Equation 3 is the preferred way of converting the compound II to the corresponding bromothiophenol, reduction of the mixture of compound II and compound V by zinc and hydrochloric acid or by catalytic hydrogenation may be employed with good results. However, reduction is more expensive than the simple interchange reaction of Equation 3.

I have further determined experimentally that the above described reactions apply equally well to the nuclear bromination of certain alkyl thiophenols. Based upon the experimental data tabulated below, I have concluded that the nuclear bromination of thiophenols in accordance with my invention is applicable to thiophenols having the following formula:

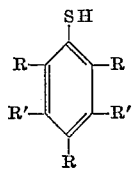

where R and R' are selected from the class consisting of hydrogen and alkyl groups, preferably lower alkyl, at least one R being hydrogen. Thus, the disulfide employed in the reaction of Equation 1 would have the formula:

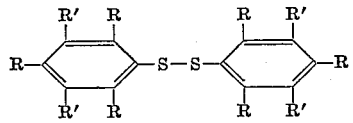

where R and R' are the same as above.

The following examples illustrate the process of the invention. The disulfide corresponding to compound I of Equation 1 is first obtained by oxidative treatment of the particular thiophenol it is desired to brominate. The oxidative treatment may conveniently be accomplished by oxidation with chlorine or bromine in a pentane or hexane solution. The disulfide is then reacted with two moles of bromine added at a rate to maintain a controllable reaction. Generally the reaction is conducted at a temperature between 0 and 30° C., preferably between 10 and 15° C. At the end of the reaction period as evidenced by the cessation of HBr generation, a quantity of the appropriate thiophenol is added which is sufficient to convert the bromine-containing by-product to the disulfide form, as evidenced again by the cessation of HBr generation. Thiophenol, or any alkyl thiophenol as defined above may be used in this step, but as a practical matter it is obviously desirable to use the particular thiophenol that is being brominated, thereby simplifying recovery and recycling. The mixture of disulfides is then converted to the thiol form by any one of the previously described methods, but preferably by the interchange reaction.

*Example 1.—p-Bromothiophenol*

1. *Preparation of diphenyl disulfide.*—A 12-liter reaction flask was fitted with a stirrer, with an efficient water-cooled condenser surmounted by a Dry Ice condenser which was vented via a drying tube to a water scrubber, and with a gas feed pipe adapted to extend below the level of liquid in the flask. The reactor was charged with 2200 grams of 99+% thiophenol and 6000 ml. of commercial pentane. Chlorine was added over a period of 5.3 hours with stirring. The rate was limited by the capacity of the condensing system. The maximum reaction temperature was 25° C. Crystallization of diphenyl disulfide from the reaction mixture began during the chlorination. It is important to avoid an excess of chlorine which generates benzenesulfenyl chloride from the initially-formed disulfide. The correct end-point of the reaction is easily detected by the appearance of a yellow color first at the point of gas entry and then generally throughout the crystal slurry. The presence of thiophenol (incomplete reaction) or benzenesulfenyl chloride (excessive chlorination) is also detected readily by odor. For this purpose, a glass rod is dipped into the reaction mixture, withdrawn, the liquid on the end of the rod blown to remove hydrogen chloride and pentane and the residual material cautiously tested. It is desirable to use a deficiency of chlorine, rather than an excess.

The slurry was cooled to 16° C. and vacuum-filtered. The cake was washed with 2000 ml. of pentane and air-dried to yield 1947 grams (89.5% of theory) of pure diphenyl disulfide, M.P. 60–62° C.

The pentane filtrates were returned to the reactor along with 2200 grams of thiophenol. The same chlorination procedure was repeated to yield 2161 grams of disulfide (99.3% of theory), M.P. 60–62° C.

A third cycle yielded 2092 grams (95% yield) of disulfide, M.P. 60–61° C. A second crop of product, 182.5 g., M.P. 60–61.5° C., was obtained by partial removal of pentane. Total yield for the three cycles was 6382 grams or 97.4% of theory. No attempt was made to recover the remainder of the material from the final mother liquors since past experience indicated that such a product is of poor quality.

2. *Bromination of diphenyl disulfide.*—A 2-liter, 3-necked flask was fitted with a bottom withdrawal stopcock, a stirrer, thermometer, compensated dropping funnel, and reflux condenser vented via a drying tube to a water scrubber. To 220 grams of crystalline diphenyl disulfide, prepared by the method described above, was added 320 grams of bromine over a period of 0.7 hour with stirring. The temperature dropped to 16° C., then rose to 35° C. autogenously during the addition of bromine. After being stirred an additional one hour, the reaction mixture was allowed to stand at room temperature (20° C.) for 17 hours. The conversion to ring-brominated products was 88% of theoretical.

3. *Oxidative treatment with thiophenol.*—To the reaction mixture, an orange, oily solid, were added 330 grams of 99+% thiophenol. This amount of thiophenol is more than sufficient not only for this step, but also for the next interchange step. Hydrogen bromide is formed immediately upon addition of the thiophenol. The mixture was heated slowly to 40° C. (0.5 hour) with eventual stirring to form a clear amber solution which was degassed (that is, freed of hydrogen bromide) by evacuating the system to 25 mm. (water aspirator) at 40° C. for 8 minutes.

4. *Interchange reaction.*—To the above reaction mixture at 40° C. was added a cold solution of 150 grams of sodium hydroxide in 460 ml. of water. The temperature rose to 52° C. The apparatus was purged with nitrogen and the temperature was maintained near 50° C. with stirring for 6.3 hours. Stirring was halted, and the heavy oil phase which separated was removed and washed with 150 ml. of 50° C. water. The wash liquor was combined with the caustic phase and was acidified with 330 ml. of 12 N aqueous hydrochloric acid (cooling). The sprung thiols and a toluene extract of the aqueous phase were combined and washed with 200 ml. of warm water. Distillation of the products on a short Vigreaux column yielded 181 grams of p-bromothiophenol.

5. *Chemical reduction of disulfides.*—To 241 grams of disulfides corresponding to the product obtained at the end of the oxidative treatment described in section 3 above, was added 72 grams of technical grade zinc powder at 23° C. with stirring. Then, 540 ml. of 6 N aqueous hydrochloric acid was added slowly with stirring while limiting the maximum temperature to 41° C. (1 hour). The reaction mixture was heated to 99° C. over a period of 1.6 hours and was maintained at 100° C. for 0.9 hour. The heavy oil phase and a toluene extract of the aqueous phase were combined, washed with 300 ml. of hot water, and distilled to yield 116 grams of thiophenol, 101 grams of p-bromothiophenol, and 4 grams of residue.

6. *Catalytic hydrogenation of disulfides.*—Disulfides corresponding to those recovered from the oxidative treatment described in section 3 above are readily hydrogenated to the corresponding thiols in the presence of 10% by weight of 20% $MoS_2$ on alumina and 1000-2500 p.s.i.g. of hydrogen at 160-200° C. The reaction is normally complete in 4-6 hours.

Attempts to hydrogenate the crude bromination product, prior to the oxidative treatment described in section 3 above, failed. Apparently, the catalyst is altered, perhaps by conversion to $MoBr_5$—a known Lewis acid, in the presence of $Br_2$ and/or HBr. Attempted hydrogenation yields only traces of thiophenol, and major amounts of diphenyl sulfide, thianthrene, and elemental sulfur. Bromide is quantitatively stripped from the aromatic rings and appears as hydrogen bromide. On the other hand, if sufficient thiophenol is added to the crude bromination mixture to convert the bromine-containing by-product present, and if the resulting material is freed of dissolved HBr by degassing at 25-50 mm./50° C. for 10-20 minutes, then the hydrogenation proceeds without difficulty to give quantitative yields of thiophenol and p-bromothiophenol.

The following Table I summarizes the data relating to the preparation of p-bromo-o-thiocresol and p-bromo-m-thiocresol using the interchange reaction. The thiocresol was first converted to its disulfide by oxidation with bromine under the conditions set forth under the heading of "Preparation of Disulfide" in Table I. Bromination of the disulfide was carried out under the condition set forth under the heading "Bromination" in Table I. The term "Soaking period" refers to the time the brominated mixture is allowed to stand after bromine addition to ensure completion of the reaction. At the end of the bromination period, the product was degassed to remove bromine and hydrogen bromide and thiocresol (corresponding to the one from which the disulfide was made) was added to the brominated product with immediate evolution of hydrogen bromide as a gas. The addition was continued with slight warming to about 50° C. until no more hydrogen bromide was evolved. The resulting product comprising principally disulfides was subjected to interchange with the same thiocresol under the conditions set forth in Table I under the heading "Interchange."

TABLE I

| Example No. | 2 | 3 |
|---|---|---|
| Thiocresol | o-Thiocresol | m-Thiocresol |
| Preparation of Disulfide: | | |
| Thiocresol charged, moles | 2.0 | 2.0 |
| $Br_2$ added, moles | 1.0 | 1.0 |
| Time, hours | 0.62 | 0.25 |
| Temperature, °C | 25-40 | 22-47 |
| Bromination: | | |
| $Br_2$ added, moles | 2.0 | 2.0 |
| Time, hours: | | |
| $Br_2$ addition | 1.83 | 0.72 |
| Soaking period | 19.0 | 6 |
| Temperature, °C.: | | |
| $Br_2$ addition | 36-32 | 46-32 |
| Soaking period | (¹) | 10 |
| Interchange: | | |
| Thiocresol charged, moles | 3.0 | 3.0 |
| NaOH (10% solution) added, moles | 3.7 | 3.75 |
| Time, hours | 6 | 2.0 |
| Temperature, °C | 50 | 50 |
| Products: | | |
| p-Bromo-o-thiocresol, moles | 0.35 | |
| p-Bromo-m-thiocresol | | 0.92 |

¹ 10 to ambient.

The following Table II summarizes the data relating to the bromination of the disulfides derived from p-thiocresol, o-isopropylthiophenol, p-(t-butyl)thiophenol, and 2,4-thioxylenol. Two moles of bromine were reacted with one mole of disulfide in each case. The brominated products, at the end of the bromination, were degassed to remove bromine and hydrogen bromide and then treated with the appropriate thiophenol until HBr evolution ceased. The resulting product was then reduced with a 25% excess of zinc dust and dilute aqueous (6 N) hydrochloric acid at 40-50° C. The products were recovered by vacuum fractionation.

TABLE II

| Example No. | 4 | 5 | 6 | 7 |
|---|---|---|---|---|
| Disulfide from | p-Thiocresol | o-Isopropyl-thiophenol | p(t-Butyl)thiophenol | 2,4-thioxylenol |
| Bromination-Conditions: | | | | |
| $Br_2$ added, moles | 2.0 | 2.0 | 2.0 | 2.0 |
| Time, hours: | | | | |
| $Br_2$ addition | 0.2 | 0.2 | 0.3 | 0.5 |
| Soaking period | 18 | 16 | 116 | 22 |
| Temperature, °C. during $Br_2$ addition and soaking period | 17-34 | 12-26 | 10-30 | 23-53 |
| Products: | | | | |
| 2-bromo-p-thiocresol, moles | .62 | | | |
| 4-bromo-o-isopropylthiophenol, moles | | .55 | | |
| 2-bromo-p(t-butyl)thiophenol, moles | | | .74 | |
| 5- and 6-bromo-2,4-thioxylenol, moles | | | | .51 |

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In the process of preparing a bromothiophenol in which a diphenyl disulfide having the following formula:

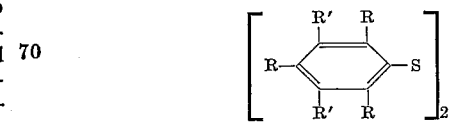

where R and R' are selected from the class consisting of hydrogen and lower alkyl groups and at least one R is hydrogen, is brominated to yield a crude bromination product comprising principally a bis-(bromophenyl)disulfide which is thereafter reduced to its corresponding bromothiophenol, the improvement which comprises adding a thiophenol to said crude bromination product until hydrogen bromide ceases to be evolved, and before reduction of said bis(bromophenyl)disulfide to its corresponding bromothiophenol is initiated.

2. The process according to claim 1 wherein R and R' are hydrogen; and said thiophenol is thiophenol itself.

3. The process according to claim 1 wherein R and R' are hydrogen, and the reduction of said bis(bromophenyl)disulfide is effected by interchange with thiophenol in the presence of sodium hydroxide; and wherein the improvement comprises adding thiophenol to the crude bromination product and heating the resulting mixture until no more hydrogen bromide is evolved, and before said sodium hydroxide is added to catalyze said interchange of thiophenol and bis-(bromophenyl)disulfide.

References Cited by the Examiner
UNITED STATES PATENTS

| | | | |
|---|---|---|---|
| 2,506,416 | 5/1950 | Gilbert et al. | 260—609 |
| 2,510,893 | 6/1950 | Kleiman | 260—608 |

OTHER REFERENCES

Bourgeois et al.: Rec. Trav. Chim. 30, pages 407–411.

CHARLES B. PARKER, *Primary Examiner.*

D. R. PHILLIPS, *Assistant Examiner.*